June 28, 1960 — A. D. ADLER ET AL — 2,942,357

ATOMIC UNITS FOR MOLECULAR MODELS

Filed Dec. 11, 1958 — 3 Sheets-Sheet 1

INVENTORS
ALAN D. ADLER
WILLIAM J. STEELE
BY Max R. Millman
ATTORNEY

ATOMIC UNITS FOR MOLECULAR MODELS

INVENTORS
ALAN D. ADLER
WILLIAM J. STEELE
BY Max R. Millman
ATTORNEY

ATOMIC UNITS FOR MOLECULAR MODELS

Filed Dec. 11, 1958 3 Sheets-Sheet 3

INVENTORS
ALAN D. ADLER
WILLIAM J. STEELE
BY
Max R. Millman
ATTORNEY

United States Patent Office 2,942,357

Patented June 28, 1960

2,942,357

ATOMIC UNITS FOR MOLECULAR MODELS

Alan D. Adler, Trooper Road, R.D. 1, Norristown, Pa., and William J. Steele, 1216 S. Wilton St., Philadelphia, Pa.

Filed Dec. 11, 1958, Ser. No. 779,578

12 Claims. (Cl. 35—18)

This invention relates to atomic units for molecular models which, as is well known, are useful educational and research tools.

To accurately represent the spatial disposition of atoms in a molecular structure, the models must provide for adjustability of three important parameters, namely bond length, bond angle and van der Waals radii.

It is the primary object of this invention to provide atomic units for molecular models which allow for adjustment of bond angles and bond lengths and for deformability of van der Waal's radii.

It is a further object of the invention to provide atomic units for molecular models which by virtue of their continuous adjustability with respect to bond angles, bond lengths and van der Waals radii, are especially adapted for the accurate representation of geometrically hindered molecules, such as small strained cyclic molecules, aromatic molecules, chelated molecules, coordination molecules and the like. Such geometrically hindered and/or resonant molecules cannot always be accurately represented by existing atomic models such as the non-space filling type (ball and stick), the space filling type (Stuart and Brieglieb types such as Leybold and Taylor-Hershfelder) and the semi-space filling type (Courtauld) because they do not allow for the continuous adjustability of all three parameters. The Stuart and Brieglieb types are described in "Methoden der Organischen Chemie" (Houben-Weyl), Revised Edition (1953), edited by E. Muller, published by Springer, Germany, the chapter entitled "Bestimmung der Molekulform mit Atomkalotten Modellen." The Taylor-Hershfelder model is described in the Taylor Patent No. 2,308,402. The Leybold model is a Stuart and Brieglieb type made by E. Leybold's Nachfolger, Cologne, West Germany, and distributed by Arthur S. La Pine and Company of Chicago, Illinois. The Courtauld type is described in Transactions of the Faraday Society, 1952, 48, 847.

Another object of the invention is to provide atomic units for molecular models of the character described which, although accurate, are nevertheless light in weight, easy to assemble and manipulate and inexpensive.

Another object of the invention is to provide atomic units for molecular models combining hollow deformable members and links of special construction and design whereby continuous adjustability of bond angles, bond lengths and van der Waals radii are readily and easily effected.

Yet another object of the invention is to provide a link of special construction and design for use with atomic units in molecular models wherein bond lengths and bond angles are capable of continuous adjustment.

These and other objects of the invention will become more apparent as the following description proceeds in conjunction with the accompanying drawings, wherein.

Specific reference will now be made to the drawings wherein similar reference characters are used for corresponding elements throughout.

Figure 1:
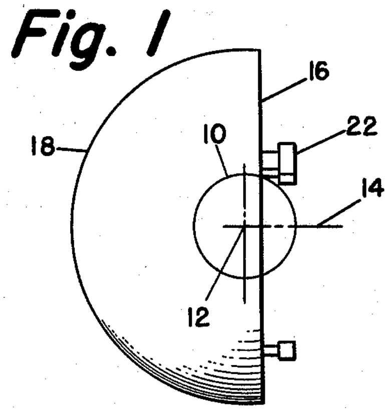
Figure 1 is a side elevation with geometric construction lines superimposed of a hydrogen atom model constructed in accordance with the principles of the invention.

Before proceeding with a description of the drawings, a brief explanation of the important parameters and bonds will be useful. The types of bonds formed between chemical species and their relative stabilities are described by quantum mechanics. An individual atom consists of a dense positively charged nucleus surrounded diffusely by as many electrons as are required for charge neutrality. These electrons repel each other and hence are localized at a region in space though in dynamic motion.

An ionic bond is formed when electrons are gained or lost completely by an element. Because the ions formed are held together by the electrostatic attraction of opposite charges, the ionic bond is omnidirectional. A covalent bond is formed when each atom contributes an electron to the bond. In this process of sharing electrons, the nuclei are drawn closer together. The internuclear distance is termed the bond length. In contradistinction to ionic bonds, a covalent bond has strong directional characteristics, i.e., the atoms can only bond at certain angles to each other known as the bond angle. Multiple bonds may be formed along the same given bond direction by the sharing of two or three electrons for each atom. It is manifest, therefore, that covalently bonded atom models must show not only their bond order (single, double or triple) but also the proper bond angles and lengths.

A respulsive force exists between all atoms not involved in a chemical union or bond because electrons tend to repel each other. The distance of closest approach between non-bonded atoms is termed the van der Waals radius. While the van der Waals radius and the ionic radius are the same for ionic compounds, covalently bonded atoms must be closer to one another than their van der Waals radii. It is therefore important that the region of space unavailable to other non-bonded atoms be properly delineated. The van der Waals region will not be a simple sphere but will depend upon the bond order, bond length and bond angle of the atoms involved in the covalent bond. The van der Waals radius is one of the most important structural features of covalent bonding.

Electron pair sharing may be accomplished by another process in which one atom forming the bond donates both of the electrons which are shared. This is termed a coordinate covalent bond. Such bonding is favored under conditions of high spatial symmetry. This type of bonding is space-filling and hence variations are primarily in the bond length.

There are other bonding situations which do not fall in the above categories, most notable of which is the "hydrogen bond," an electrostatic bond formed by the attraction of the non-bonded electrons of the smaller covalent electronegative atoms (oxygen, nitrogen and fluorine) and the hydrogen atom in covalent structures in which it tends to be electropositive. Hydrogen bonding leads to a decrease in van der Waals' radius of the covalent hydrogen atom, since it is now attracted closer to the electronegative center which itself must deform slightly.

Thus it is important that atomic units for molecular models, to have versatility, must provide for continuous adjustment of bond angles and bond length and for deformability of van der Waals radii. Also, since in geometrically hindered and/or resonant molecules the bonds are often "mixtures" of the two basic bonds, covalent and ionic, the use of bond angles, bond lengths and van der Waals radii collected on simple, strain-free molecules leads to considerable error in the structural representations, unless provision is made for precise adjustment of the three parameters.

The instant invention is directed to atomic units in which all three parameters can be continuously adjusted.

Before referring to the drawings, attention is called to the fact that data with reference to bond angles, bond length and van der Waals radii can be obtained from the literature, such as L. Pauling, "The Nature of the Chemical Bond," Cornell University Press; Evans, "Crystal Chemistry," Cambridge University Press; Wells, "Structural Inorganic Chemistry" and "The Third Dimension in Chemistry," both published by Oxford University Press, and other texts and scientific journals.

Figure 2:
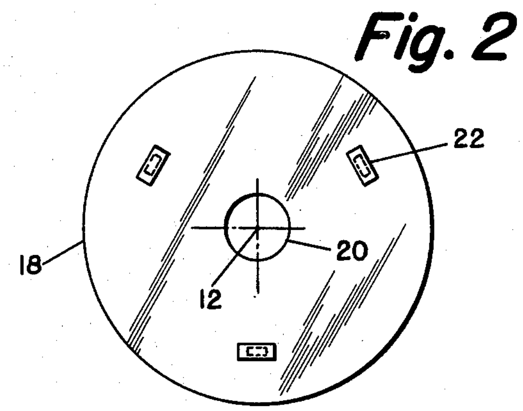
Figure 2 is an orthographic projection of Figure 1.
Figure 3:
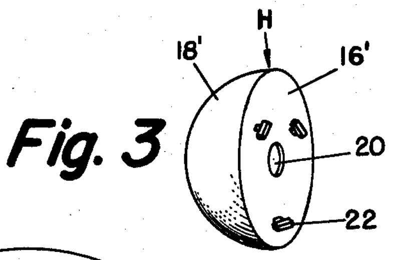
Figure 3 is a perspective view of the solid model described by Figures 1 and 2.

Referring now to the drawings which, for illustrative purposes only, relate to certain atoms, it will be understood that the planned scale of the units is arbitrary, but we prefer a scale of 2.00 cm. to 1.00 angstrom unit. Figures 1–3 relate to the hydrogen atom model H which is constructed as follows. Ascertaining from the literature that the covalent radius of hydrogen is 0.3 A. and using a scale of 1 A.=2 cm., a circle 10 is drawn from an arbitrary center 12 having an radius of 0.6 cm. A horizontal line 14 is drawn through the center. Since the link length arbitrarily chosen is 1 centimeter, a distance of ½ cm. from the circumference of the circle 10 is measured off along the horizontal line 14 towards the center 12 and a vertical line 16 is drawn therethrough perpendicular to horizontal line 14. Again using point 12 as the center and knowing that van der Waals' radius for hydrogen may be taken from observed data as 1.10 A., a circle 18 is drawn having a radius of 2.20 cm., said circle intersecting the vertical line 16. The area encompassed by the circle 18 and the vertical line 16 constitutes that of the hydrogen model. Using a suitable light-weight plastic, colored or uncolored, such as polyethylene, polypropylene and the like, a hollow unit is molded to the shape of the hydrogen model above described. The three-dimensional model, which is a portion of a sphere is shown in Figure 3 and comprises an arcuate wall 18' corresponding to circle 18 and a planar wall or bond face 16' corresponding to the vertical line 16, the unit being deformable because it is hollow, the degree of deformability depending upon the nature of the plastic chosen and the wall thickness. The thickness of the bond face wall should exceed that of wall 18' for a purpose later to appear. Since the bond direction is along the horizontal line 14 from the center of the atom 12, a hole 20 will be provided in the planar face 16' at its center and along the line 14 for the reception of the link unit to be described later. Also, the planar face 16' will carry buttons 22, preferably 120° apart and preferably T-shaped for a purpose later to appear.

Figure 4:
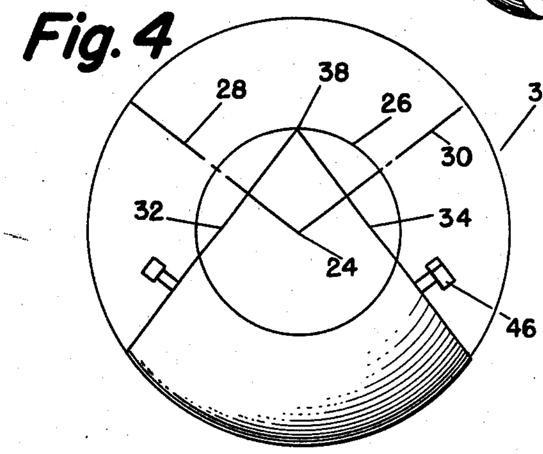
Figure 4 is a side elevation with geometric construction lines superimposed of an oxygen-di-univalent atom.
Figure 5:
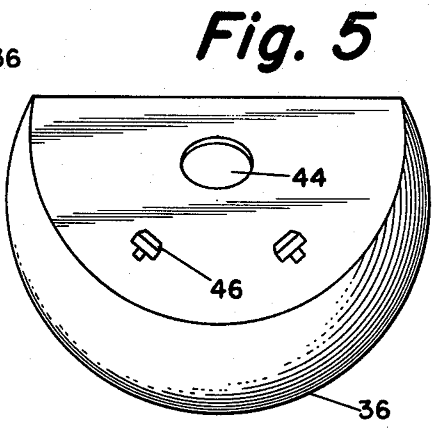
Figure 5 is an orthographic projection of Figure 4.
Figure 6:
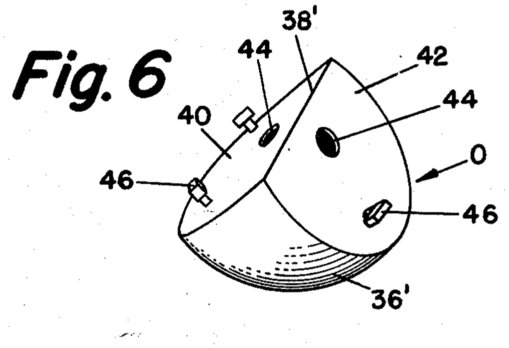
Figure 6 is a perspective view of the solid model described by Figures 4 and 5.

The di-univalent oxygen model O is shown in Figures 4–6 and is constructed along the lines indicated above as follows. With point 24 as the center, a circle 26 is drawn having a radius of 1.32 cm. or twice the recorded covalent radius of 0.66 A. for di-univalent oxygen. Since the usual covalent angle between the bond directions is 105°, using a protractor centered at point 24, this angle is laid out producing two lines 28 and 30 representing bond directions. From the points where each of said lines intersect the circle 26 a distance of ½ cm. is measured along said lines towards the center point 24 and marked off and two additional lines 32 and 34 are drawn perpendicular to lines 28 and 30 and passing through the marked-off distances. Again using the center point 24, a circle 36 is drawn with a van der Waals radius of 2.8 cm., which is twice the recorded radius of 1.4 A. It will be seen that the circle 36 intersects the lines 32 and 34 and the latter intersect at the apex 38. The area encompassed between the lines 32 and 34, the apex 38 and the smaller arc of the circle 36 represents the oxygen model. Again using a suitable light weight deformable plastic, preferably of wall thickness somewhat greater than that of the hydrogen model, a hollow unit is molded to the shape of the oxygen di-univalent model above described. The three-dimensional model, which is a segment of a sphere is shown in Figure 6 and has an arcuate wall 36' corresponding to circle 36, two planar bond faces 40 and 42 corresponding to lines 32 and 34 and a chordal apex 38' corresponding to apex 38. Since the bond directions are indicated by lines 28 and 30, holes 44 will be provided in the planar faces 40 and 42 centrally located along the bond directions. As in the case of the hydrogen model, the faces will carry buttons or T-shaped units 46, two in one face and one in the other, spaced apart at arbitrarily chosen angles.

As will be apparent, many different atom models can be constructed of light-weight deformable hollow plastic units which will vary in shape as modifications of spheres, the variations in shape depending, of course, upon the nature of the atom, its valency, its van der Waals radius, its covalent radius and the angle between its bond directions.

Figure 10:
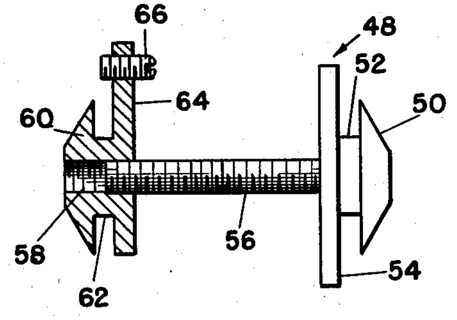
Figure 10 is a longitudinal sectional view through the adjustable link, one portion being shown in elevation.
Figure 11:
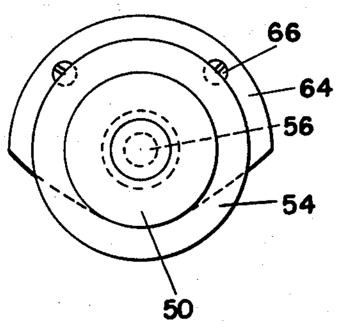
Figure 11 is a plan view looking from left to right on Figure 10.
Figure 12:
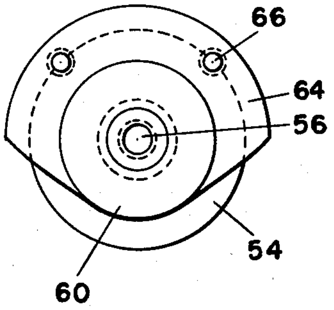
Figure 12 is a plan view looking from right to left on Figure 10.
Figure 13:
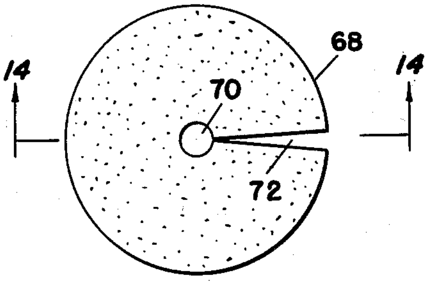
Figure 13 is a plan view of a semi-spaced filling washer employed with the adjustable link.
Figure 14:
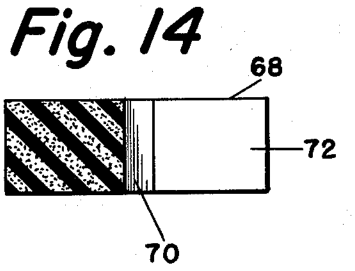
Figure 14 is a sectional view through the center of said washer taken on the line 14—14 of Figure 13.

Referring now to Figures 10–12, the adjustable link is generally indicated at 48 and comprises a tapered member 50 connected to a reduced portion 52 which is, in turn, connected to a flange 54 which extends beyond the periphery of the tapered member 50. Extending centrally from the flange is a screw or bolt 56 which is threaded along its entire length, the length being arbitrarily chosen as 2.5 cm. The free end of the threaded member is received in the internally threaded bore 58 of an opposing member which includes a tapered member 60 like member 50. The tapered member 60 is connected to a reduced shank portion 62 which is, in turn, connected to a flange 64 that for slightly in excess of 180° extends somewhat beyond the periphery of the flange 54. At predetermined locations, the portion of the flange 64 which extends beyond flange 54 is provided with apertures receiving threaded members, such as set screws 66.

The semi-space filling units comprise flexible or foam rubber washers 68 having a central aperture 70 of diameter approximating that of the screw 56, there being a tapered slit 72 extending from the outer edge of the washer to the central aperture to facilitate the mounting of the washer on the screw 56 between the flanges 54 and 64.

Figure 7:
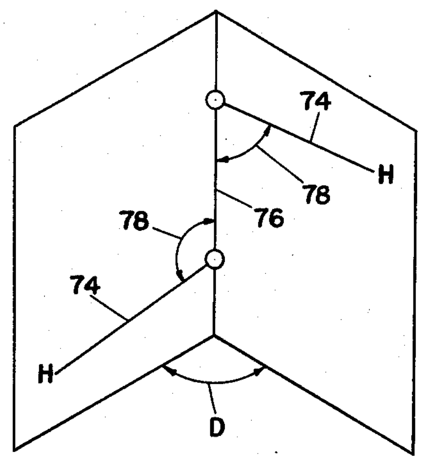
Figure 7 is a diagrammatic view of a gaseous hydrogen peroxide molecule.
Figures 8, 9:
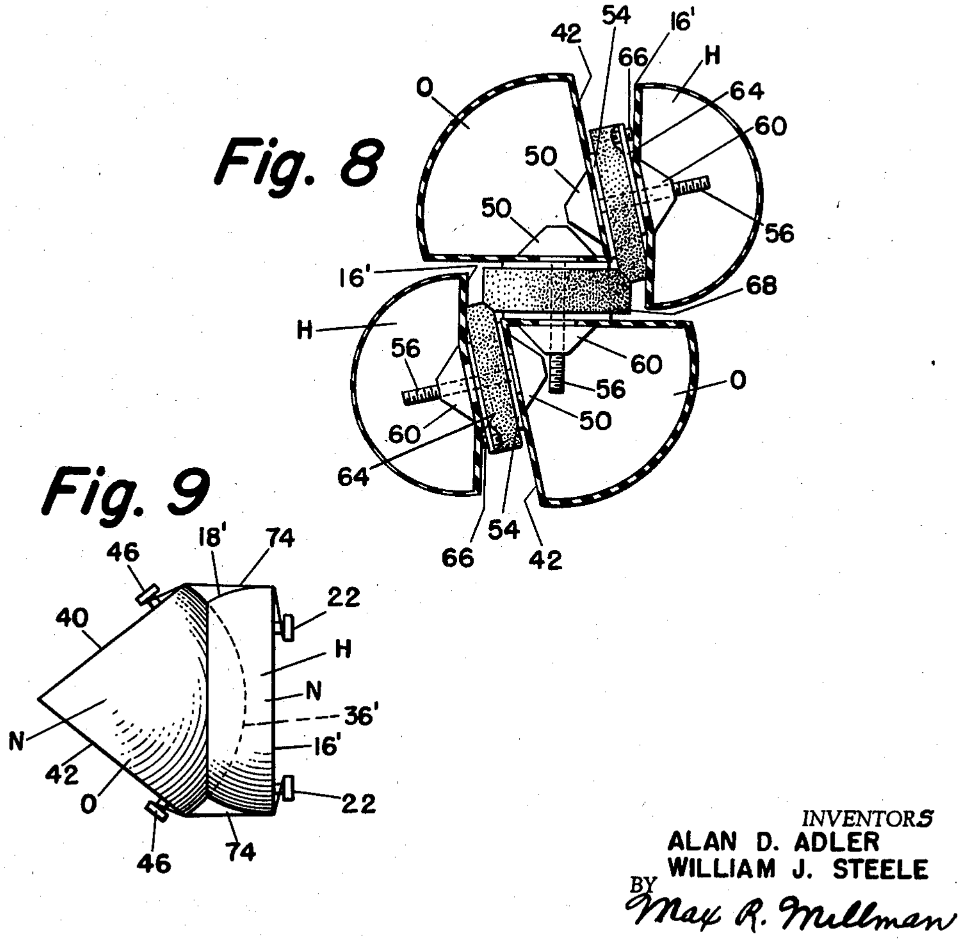
Figure 8 is a vertical sectional view through a gaseous hydrogen peroxide molecule employing the adjustable links of the present invention, some parts being shown in elevation.
Figure 9 is an elevational view of assembled oxygen and hydrogen units illustrating the deformability of the hydrogen unit as, for example, in a "hydrogen bonded situation"

The use of the adjustable links and hollow plastic distortable atom models as described above for the accurate representation of a molecule is shown in Figures 7 and 8, gaseous hydrogen peroxide having been chosen for illustrative purposes. The spatial arrangement of the atoms in gaseous $H_2O_2$ is shown diagrammatically in Figure 7. From the literature one learns that the molecule assumes a position in which the hydrogen atoms are in planes at a dihedral angle D to each other of 92°, the oxygen atoms being located at the intersection of said planes. The H—O bond length 74 is taken as 0.96 A. (based on the sum of the covalent radii), the O—O bond length 76 is given as 1.46 A. and the O—O—H bond angles 78 as 101°, 30′ (based on observed physical data).

In the three-dimensional unit of Figure 8, the hydrogen and oxygen models are attached to each other by the link units 48. The tapered member 50 of each link is pushed into the O model through the apertures 44 until the planar or bond faces 42 engage in the space between the flange 54 and the tapered member 50. The opposing tapered member 60 is then turned on the screw 56 until the desired bond length (0.96 A.=1.92 cm.) is attained and then the tapered member 58 is pressed through the hole 20 of the H model until the planar wall or bond face 16′ of the model is engaged in the space between the flange 64 and the tapered member 60. Desirably, said space slightly exceeds the thickness of the planar wall 16′ of the H model to allow for rotation of the model. As for the O—O bond length, the link connecting them can also be adjusted to the desired value (1.46 A.=1.92 cm.). Because the models are hollow and the screws 56 extend therein, it is manifest that continuous adjustment can be made over the entire lengths of the screws.

The models are so designed that 0.25 A. of each of their covalent radii are assigned to the link. Therefore, in simple strain-free molecules where the sum of the covalent radii does give the observed interatomic distance or bond length, one requires a 1 cm. link between the planar or bond faces of the models to give this distance. If the observed bond length differs from the sum of the covalent radii, this must be adjusted for in the link accordingly. This is the case in gaseous $H_2O_2$ where the true observed bond length is 1.46 A. or 2.92 cm. The sum of the O—O covalent radii is $2 \times 0.66$ A.=1.32 A.=2.64 cm. requiring that the link length between the planar faces 42 of the O atoms be increased from 1.0 cm. to 1.28 cm. giving a 1.46 A. separation between the nuclei of the O atoms, the desired interatomic distance. Since the total length of the threaded portion of the link is chosen as 2.5 cm., the free tapered member 60 is turned until the planar faces are 1.28 cm. apart.

The literature states that the usual bond angle for oxygen-di-univalent, i.e., the bond angle most frequently encountered in a host of compounds, is 105°. Thus, the O model herein constructed has a bond angle of 105°. Therefore, when the O and H atoms are attached to each other by the adjustable links to form gaseous $H_2O_2$, it will be seen that the bond angles will be 105° instead of 101°, 30′. The adjustment of the angle from 105° to 101°, 30′ can be readily effected by the screws 66 carried by the flanges 64 of the link assemblies. Knowing that for small angles up to 25° the sine of the angle is equal to the angle with a maximum error at the upper range of 2.5%, the distance between the axis of the set screw 66 and the axis of the screw 56 is chosen as one centimeter. The sine of the angle to be adjusted is then equal to the distance between the planar face 16′ of the H atom model and the face of the flange 64. From appropriate tables, the angle of adjustment is read in radians which will be the same in centimeters. This value in centimeters is then the length the set screws 66 must extend beyond the flanges 64, the free ends of the screws exerting pressure on the planar faces 16′ to maintain the adjusted angle. The semi-space filling washers 68 are then assembled on the screws 56. Rotation of the H models can also be effected to attain the dihedral angle of 92°.

Attention is called to the fact that the O—O—H bond angle adjustment may desirably be effected by reversing the adjustable link so that the set screws 66 abut the planar faces 42 of the O model rather than abutting the planar faces 16′ of the H model.

In many compounds, hydrogen finds itself between adjacent highly electronegative elements. This allows an electrostatic bond to be formed between the hydrogen and the electronegative elements in which the nuclei are drawn closer together, thereby distorting the van der Waals radii. A sound and effective way of depicting this is to show distortion in the H atom model. Figure 9 demonstrates this. Note that the arcuate wall 36′ of the O atom model presses into and distorts the arcuate wall 18′ of the H atom model, thereby bringing the nuclei N closer together, there being flexible bands or springs 74 hooked over the buttons 22 and 46 of the H and O atom models respectively to maintain this position. To maintain the atom models in the position shown and minimize distortion which may result from the pressure of the springs 74, the models may be molded so that the arcuate walls 18′ and 36′ are thinner than the planar bond face walls 16′, 40 and 42.

Thus it will be seen that atomic units for molecular models are provided which not only provide for continuous adjustment of bond angles and bond lengths and for deformability of van der Waals radii, but which are also light in weight, durable, relatively inexpensive and capable of representing the widest variety of compounds.

While a preferred embodiment of the invention has been shown and described herein, it will be understood that minor variations may be made by skilled artisans without departing from the spirit of the invention and the scope of the appended claims. Thus, different colors can be chosen to represent the different atom models. The washers may be tinted with three intensities of the same color to represent single, double and triple bonds. Ionic atom models and elemental atom models can be depicted by simple hollow spheres. The present atom models can be modified to receive binding pins to restrain free rotation as is required, for example, in multiple bonding situations. Coordinate covalent models may also be designed in the same fashion as the covalent models.

We claim:

1. An atomic unit for molecular models comprising a hollow deformable member having at least one planar bond wall and a link assembly operatively connected to said bond wall, said link assembly having an elongated member, means to adjust said hollow member along the length of said elongated member and means to adjust the angle of said hollow member relative to the axis of said elongated member.

2. An atomic unit for molecular models comprising a hollow deformable member having at least one planar bond wall and a link assembly operatively connected to said bond wall, said link assembly having an elongated member, means to adjust said hollow member along the length of said elongated member and means to adjust the angle of said hollow member relative to the axis of said elongated member, said elongated member being a threaded rod and said means to adjust said hollow member along the length thereof including an internally threaded grommet retained by said bond wall and receiving said threaded rod.

3. The atomic unit of claim 2 wherein said means to adjust the angle of said hollow member includes a flange extending from said grommet and at least one set screw carried by said flange and adapted adjustably to bear against said planar wall.

4. Atomic units for molecular models comprising at least two hollow deformable members, each having at least one planar bond wall and a link assembly joining said bond walls, said link assembly including an elongated member, means to adjust one of said hollow members along the length of said elongated member relative to said other hollow member and means to adjust the angle of said one hollow member relative to the axis of said elongated member.

5. Atomic units for molecular models comprising at least two hollow deformable members, each having at least one planar bond wall and a link assembly joining said bond walls, said link assembly including an elongated member, means to adjust one of said hollow members along the length of said elongated member relative to said other hollow member and means to adjust the angle of said one hollow member relative to the axis of said elongated member, said elongated member being a threaded rod and said means to adjust said hollow members lengthwise on said rod including a collar fixed to one end of said rod and retained by the planar wall of said other hollow member and an internally threaded grommet retained by the planar wall of said one hollow member and receiving said threaded rod.

6. The combination of claim 5 wherein said means to adjust the angle of said one hollow member includes a flange extending from said grommet and at least one set screw carried by said flange and adapted adjustably to bear against the planar wall of said one hollow member.

7. An adjustable link for use with atom models comprising an elongated threaded member, a first collar fixed to one end of said member adapted to be retained by an atom model, a second internally threaded collar receiving said member and adapted to be retained by a second atom model, a flange extending from said second collar and at least one set screw carried by said flange and adapted adjustably to bear against a face of the second atom model.

8. A molecular unit comprising at least two generally spherical hollow flexibly deformable bodies representing atoms, each having at least one planar bond face, means carried by said planar face to receive a bonding element, and means retaining the bodies together so that one body presses against and into the other to such an extent as to represent true deformability of the van der Waals volumes.

9. An atomic unit for molecular models comprising a hollow deformable member having at least one planar bond wall and a link assembly operatively connected to said bond wall, said link assembly having an elongated member and means to adjust said hollow member along the length of said elongated member.

10. An atomic unit for molecular models comprising a hollow deformable member having at least one planar bond wall and a link assembly operatively connected to said bond wall, said link assembly having an elongated member and means to adjust and fix the angle of said hollow member relative to the axis of said elongated member.

11. An atomic unit for molecular models comprising a member having at least one planar bond wall and a link assembly operatively connected to said bond wall, said link assembly having an elongated member, means to adjust said member along the length of said elongated member and means to adjust the angle of said member relative to the axis of said elongated member.

12. Atomic units for molecular models comprising at least two deformable members, each having at least one planar bond wall and a link assembly joining said bond walls, said link assembly including an elongated member, means to adjust one of said members along the length of said elongated member relative to said other member and means to adjust the angle of said one member relative to the axis of said elongated member.

References Cited in the file of this patent

UNITED STATES PATENTS

| | | |
|---|---|---|
| 2,308,402 | Taylor | Jan. 12, 1943 |
| 2,601,729 | Underwood | July 1, 1952 |
| 2,882,617 | Godfrey | Apr. 21, 1959 |

OTHER REFERENCES

The Review of Scientific Instruments, vol. 24, No. 8, pages 621–627, August 1953.